J. O. AKERS.
AUTOMOBILE LOCK.
APPLICATION FILED MAY 29, 1920. RENEWED JUNE 25, 1921.
1,408,237.
Patented Feb. 28, 1922.
2 SHEETS—SHEET 1.
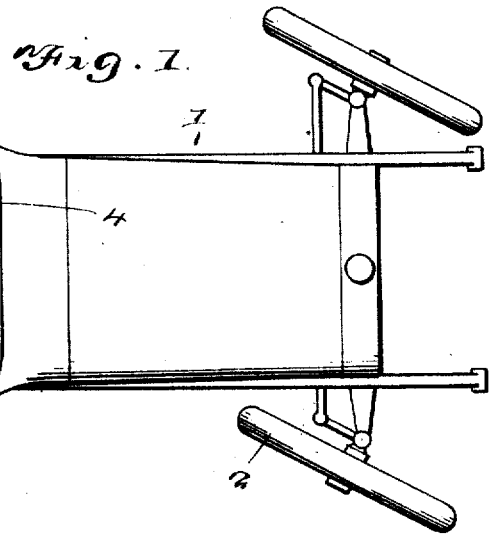
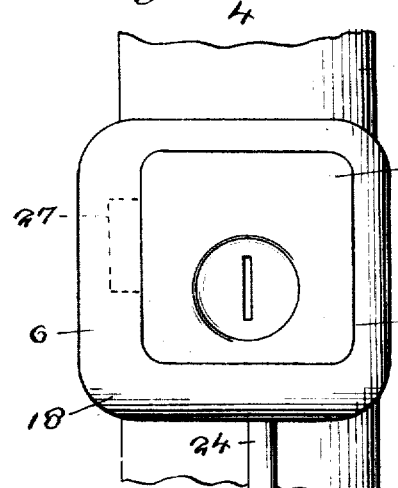
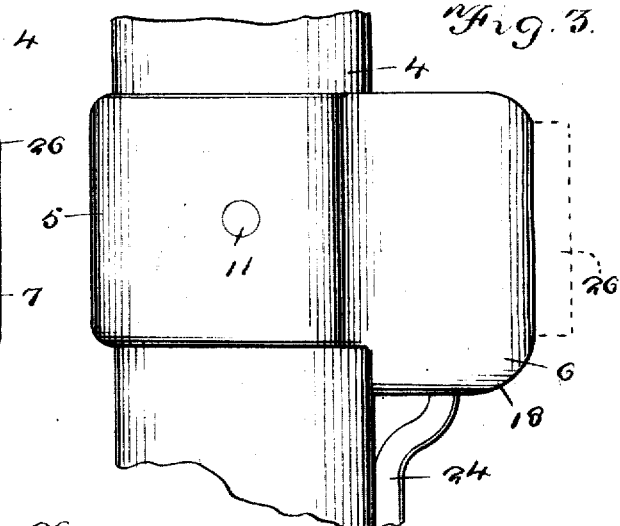
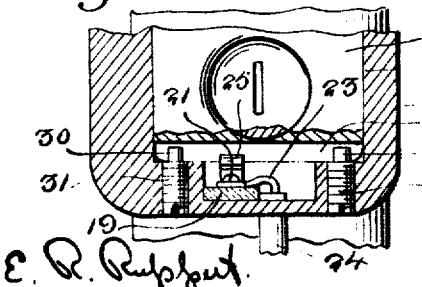
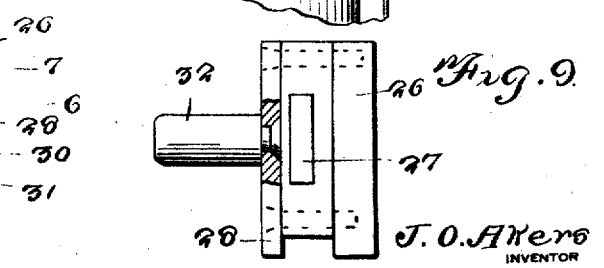
J. O. Akers
INVENTOR
BY Victor J. Evans
ATTORNEY
WITNESS:

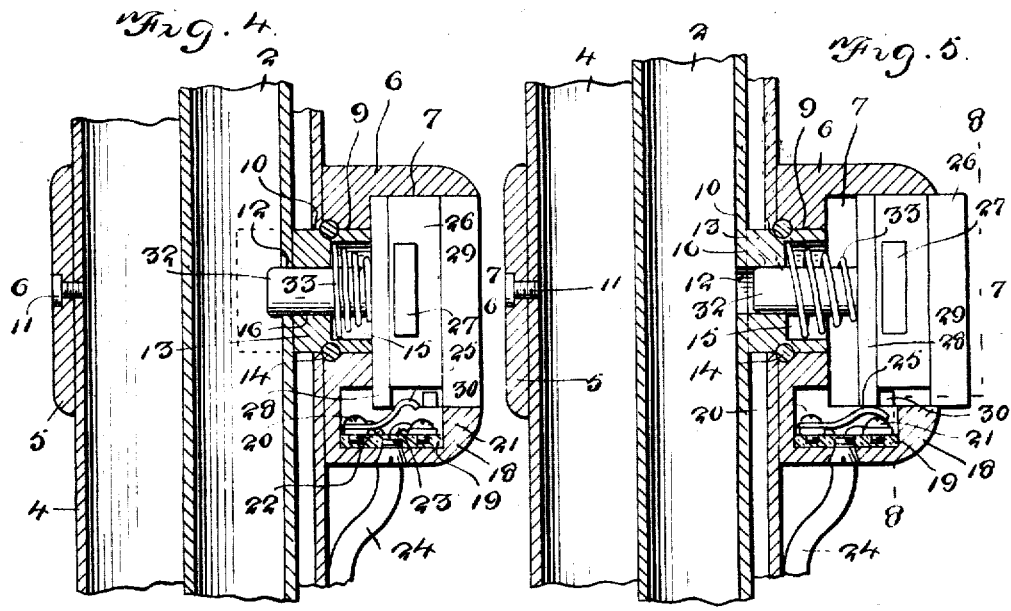
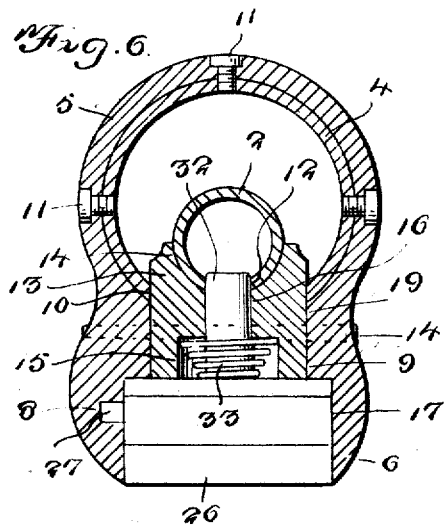

UNITED STATES PATENT OFFICE.

JAMES O. AKERS, OF BALTIMORE, MARYLAND.

AUTOMOBILE LOCK.

1,408,237. Specification of Letters Patent. Patented Feb. 28, 1922.

Application filed May 29, 1920, Serial No. 385,232. Renewed June 25, 1921. Serial No. 480,460.

*To all whom it may concern:*

Be it known that I, JAMES O. AKERS, a citizen of the United States, residing at Baltimore, and State of Maryland, have invented new and useful Improvements in Automobile Locks, of which the following is a specification.

My present invention has reference to means for locking the steering post of an automobile to the steering column so that the machine cannot be used by unauthorized persons, and may be considered in the nature of an improvement upon my United States application, Serial No. 346,269, filed December 20, 1919, and allowed April 15, 1920.

The primary object of the present invention is the provision of means for locking the steering post of an automobile to the steering post column when the post has been turned in the column to arrange the steering wheels angularly with respect to the machine, whereby to prevent the travel of the machine in a straight course, certain elements of the locking means providing bracing or sustaining means for the steering post, and the said locking means also including switch operating mechanism whereby the circuit of the ignition system of the automobile will be broken when the post is locked, so that the engine cannot be started when the lock is applied.

It is also my purpose to produce a combined locking means for the steering post of an automobile and switch operating mechanism for the electric circuit thereof, in which the mechanism may be readily actuated in post locking and circuit closing position, and automatically retained out of engagement with the post and out of contact with the switch of the electric circuit, when the machine is to be propelled.

The foregoing, and other objects which will present themselves as the nature of the invention is better understood, may be accomplished by a simple construction, combination, and operative arrangement of parts, such as is disclosed by the drawings.

In the drawings:—

Figure 1 is a fragmentary plan view of an automobile showing the improvement attached to the steering post and also showing the angular arrangement of the steering wheels with respect to the body of the machine when the post is locked on the steering column.

Figure 2 is a front elevation of the improvement, the steering post and the column being broken away.

Figure 3 is a side elevation thereof.

Figure 4 is a sectional view approximately on the line 4—4 of Figure 2, the post being locked to the steering column.

Figure 5 is a similar sectional view showing the locking means in their initial inactive position.

Figure 6 is a sectional view approximately on the line 6—6 of Figure 4.

Figure 7 is a sectional view approximately on the line 7—7 of Figure 5.

Figure 8 is a detail sectional view approximately on the line 8—8 of Figure 5.

Figure 9 is an elevation of the lock casing, parts being in section.

Referring now to the drawings in detail, the numeral 1 designates the front portion of an automobile, 2 the steering post, 3 the steering wheel connected to the post, and 4, the steering column which encloses the post.

On the steering column, at a suitable distance below the steering wheel, I secure a sleeve 5. The sleeve, upon its inner face, is formed with an enlargement which is in the nature of a rectangular or square boss 6. The boss, from the outer face thereof, is provided with a substantially square or rectangular socket 7 having one of the side walls thereof formed with a notch 8. The rear wall of the socket has a square or rectangular opening 9 which aligns with a similar opening 10 in the steering post column 4.

The sleeve is preferably secured on the column by screws 11 that have their heads received in reamed portions that surround the screw openings. The securing elements 11 are preferably arranged on the face of the sleeve opposite that provided with the boss as well as on the sides of the said sleeve.

When the steering post is to be locked to the steering post column, the steering wheel is turned to arrange the steering wheels 2 at an angle with respect to the body of the machine, which brings a notch 12 that is formed in the steering post centrally of the openings 9 and 10.

The foregoing description is similar to that set forth in my referred to application Serial No. 346,269, and certain of the elements hereinafter to be described also bear a similarity to elements set forth in my said application, and the functions of the remaining elements are attained in a different and better manner than those set forth in the said application.

Passing through the openings 9 and 10, in the sleeve and in the steering column is a block 13. This block has its inner face concaved, as at 14, the concavity being rounded and snugly receiving therein the steering post 2. The block 13 does not exert a frictional engagement against the steering post, but serves as a means for steadying the said post both when stationary and when turned in the steering column. The block 13 is locked in proper position through the medium of a pin or the like, indicated by the numeral 14, that passes transversely through the box 6 of the sleeve 5 and through the opening 9 in the said boss, as well as, of course, through the block 13.

The block 13 has its rear face formed with a substantially rectangular pocket 15 and has a central opening extending from the inner wall of the pocket to the concaved face thereof, as indicated by the numeral 16.

The boss 6, at the lower wall of the socket 7 therein is provided with a depressed portion 18 in which is seated a block 19 of insulating material that carries contact members 20 and 21 respectively to which are connected the conductor wires 22 and 23 which are enclosed in a casing 24, and which are connected to the ignition system of the machine. On the contact member 20 there is a spring switch 25 that is designed, when depressed, to engage with the contact member 21, but normally, through its inherent resiliency, held out of such engagement.

Received for longitudinal movement through the socket 7 of the boss 6 is a square or rectangular lock casing 26. In the casing is suitable mechanism for actuating a bolt 27 that, when the casing is forced fully into the socket 7, registers with the notch 8, and by the turning of a key is received in the said notch. The casing 26 has both of its ends enlarged, the inner enlargement being indicated by the numeral 28, and the outer by the numeral 29. Passing through the bottom of the boss 6, and entering the socket 7 are the reduced non-threaded ends 30 of non-headed screw members 31. The elements 30 are disposed in the path of contact with the inner flange 28 of the lock casing when the same is in retracted position and the said elements may be in the path of contact with the flange 29 when the lock casing is forced into the socket 7.

The inner flange 28 may be in the nature of a removable element, and carries a centrally disposed lug 32. The lug 30 is somewhat elongated and is at all times received in the opening 16 of the block 13 and in a position to be received through the opening 12 in the steering post when the said post is turned, as previously described, to bring the steering wheels at an angle with respect to the body of the machine.

In the pocket 15 of the block, surrounding the lug 32, and exerting a tension between the inner wall of the said pocket and the inner face of the lock casing 26, is a coiled spring 33. The spring 33 is of a conical formation, and is of sufficient strength to at all times hold the lock casing 26 in an outwardly projected position with respect to the socket of the lug 6.

When the lock casing is projected outward of the socket of the lug by the spring 33, the inner flange 28 thereof will contact with the arched or upwardly rounded portion of the switch spring 25, depressing the latter and causing the same to engage with the contact 20. This closes the ignition circuit, permitting the proper operation of the motor. In locking the post to the column and for breaking the ignition circuit, the key is just inserted in the key opening in the lock casing and the said lock casing is forced into the socket, projecting the stud 32 through the opening in the block 10 and into the opening 12 in the steering post. The key is turned so that the bolt 27 is received in the notch or keeper 8 in the lug. All of the parts are designed to remain permanently on the steering column, except, of course, the key for the lock. Upon releasing the bolt 27, the lock casing, and the stud carried thereby will automatically, through the medium of the spring 33, move to an outward position, which, as previously stated, actuates the switch 25 to complete the ignition circuit. The steering post locking device and circuit breaker may be applied to any ordinary construction of automobiles.

It will be apparent that the device will serve as a reminder to the operator of the car to lock the same when leaving the machine, as it is necessary to push in the lock casing to break ignition circuit and stop the motor.

It is believed that the foregoing description, when taken in connection with the drawings, will fully set forth the simplicity and advantages of the improvement without further detail description.

Having thus described the invention, what I claim, is:—

The combination with the steering post and column and the circuit of the ignition system of an automobile, said post and column having openings therein; of a sleeve surrounding and secured to the column and provided with a socket and an opening communicating between the socket and the opening of the column, a block secured in the said opening having a concaved face to engage the post, and said block having an opening therethrough, a lock casing having its ends flanged in the socket and carrying a bolt, a stud in the casing projecting through the opening in the block, and designed to enter the opening in the steering post, spring means between the block and casing for influencing the same to an unlocking position, means for limiting the movement of the casing in both directions, the socket having a depression communicating therewith, conductors for the ignition system entering the depression and insulated therefrom, a spring influenced normally open switch between the conductors in the path of engagement with the inner flange of the lock casing whereby, when the latter is moved outward of the socket to contact therewith and to close the circuit, means in the socket to engage the bolt of the lock casing when the latter is drawn into the socket to bring the lug thereof in engagement with the opening in the post, and the spring switch of the circuit designed to spring between the flanges of the casing when the latter is in its last mentioned position.

In testimony whereof I affix my signature.

JAMES O. AKERS.